(12) United States Patent
Toda et al.

(10) Patent No.: US 6,754,408 B2
(45) Date of Patent: Jun. 22, 2004

(54) OPTICAL SWITCH AND DISPLAY UNIT

(75) Inventors: Atsushi Toda, Kanagawa (JP); Hirotaka Akao, Tokyo (JP); Akira Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 29 days.

(21) Appl. No.: 10/044,461

(22) Filed: Oct. 23, 2001

(65) Prior Publication Data

US 2002/0159021 A1 Oct. 31, 2002

(30) Foreign Application Priority Data

Oct. 23, 2000 (JP) ..................... P2000-322273
Jan. 29, 2001 (JP) ..................... P2001-020382

(51) Int. Cl.[7] ............................................... G02B 6/35
(52) U.S. Cl. ..................... 385/16; 385/901; 349/193
(58) Field of Search ............... 385/16–23; 349/192–202

(56) References Cited

U.S. PATENT DOCUMENTS

| | | | | |
|---|---|---|---|---|
| 3,838,908 A | * | 10/1974 | Channin | 349/19 |
| 3,918,794 A | * | 11/1975 | Milton | 385/40 |
| 6,111,633 A | * | 8/2000 | Albert et al. | 349/196 |

FOREIGN PATENT DOCUMENTS

| | | | | | |
|---|---|---|---|---|---|
| JP | 57142622 A | * | 9/1982 | ............ | G02F/1/31 |
| JP | 07140455 A | * | 6/1995 | ......... | G02F/1/1335 |

* cited by examiner

*Primary Examiner*—Hemang Sanghavi
*Assistant Examiner*—Scott Alan Knauss
(74) *Attorney, Agent, or Firm*—Sonnenschein, Nath & Rosenthal LLP

(57) ABSTRACT

The present invention provides an optical switch for making part of incident light, which has been made incident on an optical waveguide, selectively emergent to a light emergence portion provided outside the optical waveguide. The optical switch includes a liquid crystal device for selective emergence of the incident light. An arbitrary layer of the liquid crystal device is set such that letting $\Delta n$ be a difference between a refractive index $n_0$ of the optical waveguide and a refractive index $n_1$ of the arbitrary layer of the liquid crystal device, "d" be a thickness of the arbitrary layer, and $\lambda$ be a wavelength of the incident light, the values of $\Delta n$, "d", and $\lambda$ satisfy a condition of $2.20 \times 10^{-3} \leq |\Delta n \cdot d \cdot \lambda^{-1}| \leq 3.03 \times 10^{-3}$. With this optical switch, the uniformity of a light emergence efficiency can be easily realized by making use of a small change region in which the light emergence efficiency is not largely varied. The present invention also provides a display unit using the optical switches.

13 Claims, 13 Drawing Sheets

F I G. 10
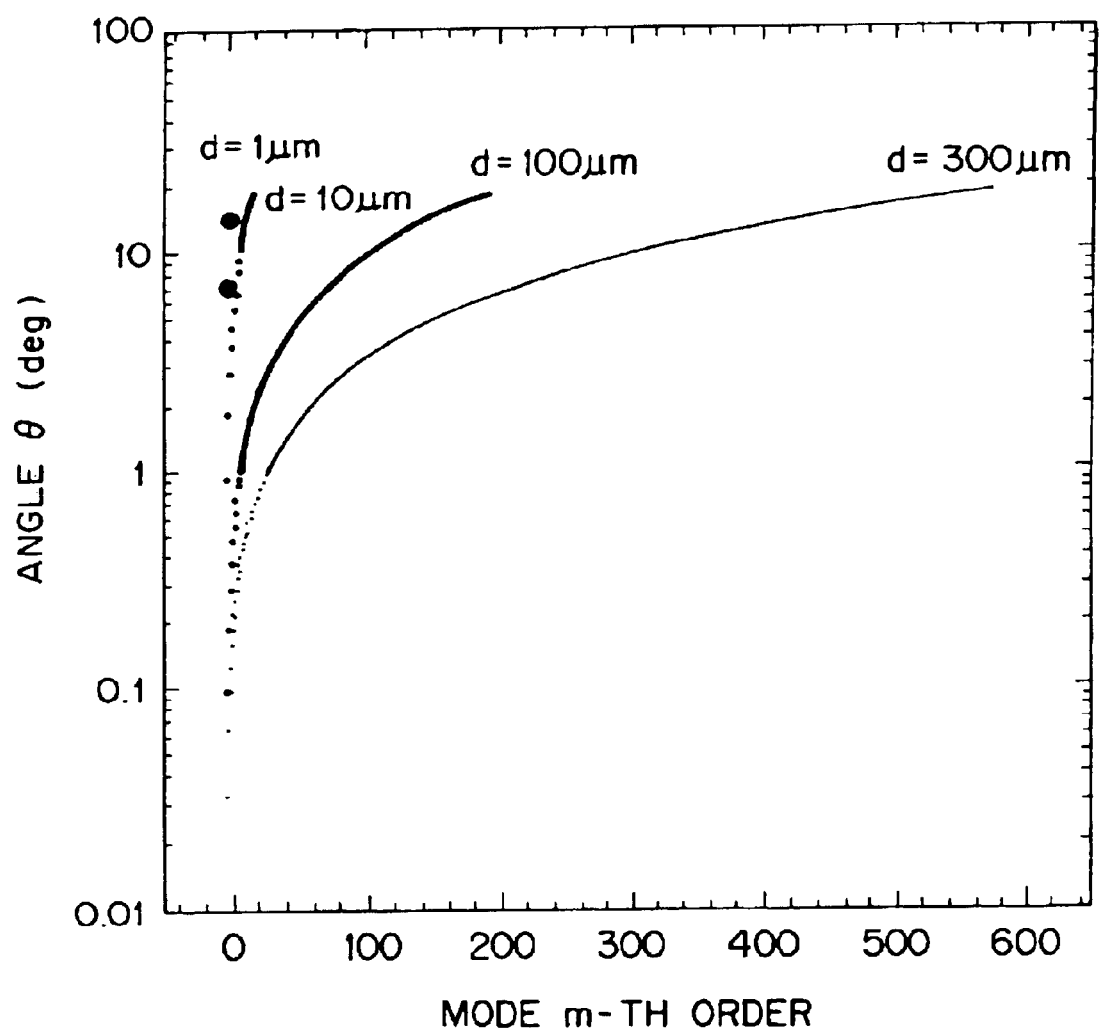

F I G.12
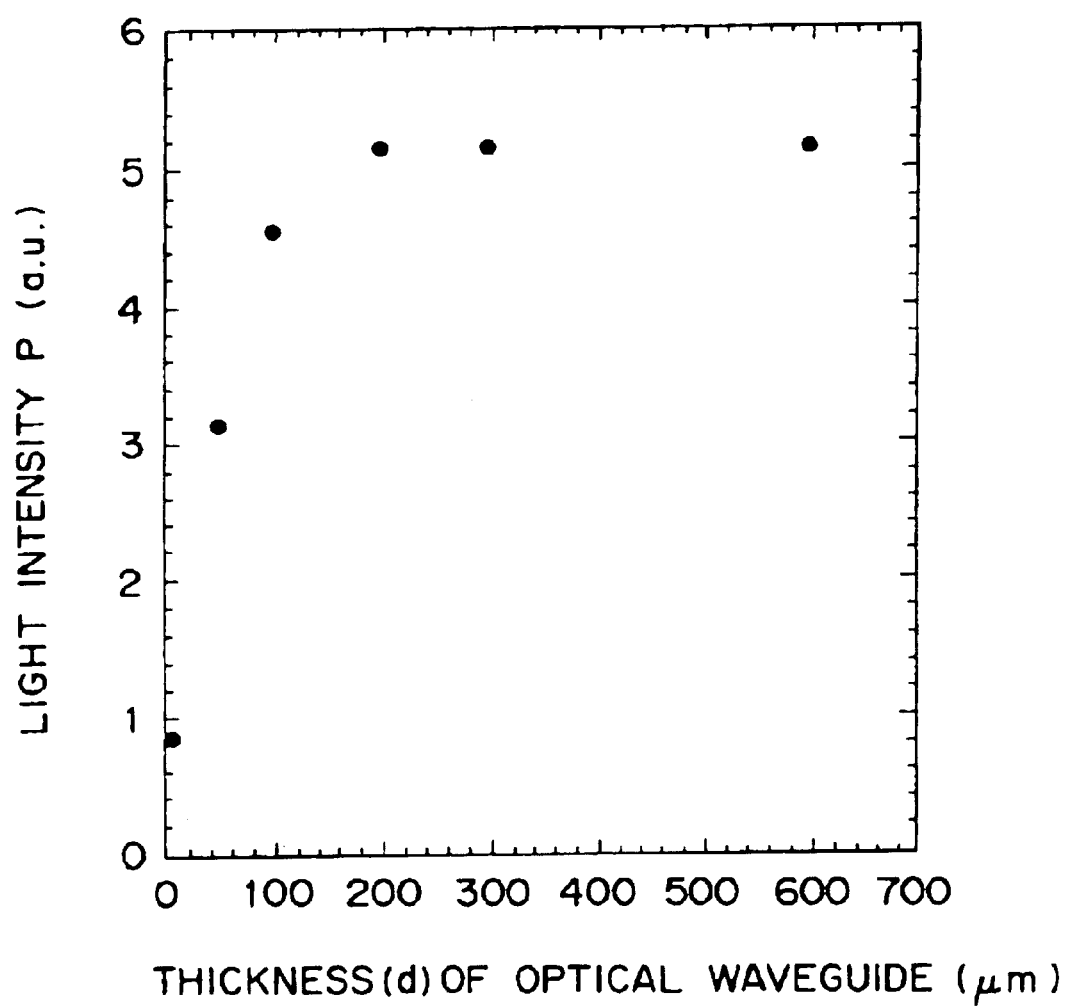

US 6,754,408 B2

OPTICAL SWITCH AND DISPLAY UNIT

RELATED APPLICATION DATA

The present application claims priority to Japanese Application(s) No(s). P2000-322273 filed Oct. 23, 2000, and P2001-020382 filed Jan. 29, 2001, which application(s) is/are incorporated herein by reference to the extent permitted by law.

BACKGROUND OF THE INVENTION

The present invention relates to an optical switch for making light in an optical waveguide selectively emergent therefrom, and a display unit on which the optical switches are arrayed.

In home televisions, a cathode-ray tube having a mechanism of emitting light by exciting phosphors with electron beams is used as a display. In liquid crystal displays, a light transmittance is changed by varying a polarization characteristic of liquid crystal. In these liquid crystal displays, a color of white light is selected by using a filter. In plasma displays, phosphors are excited with ultraviolet rays generated by plasma.

By the way, television receivers have disadvantages that a depth of a cathode-ray tube is long, thereby making it impossible to realize a thin display, and that the weight of the cathode-ray tube is heavy. A further disadvantage of the television receivers is that since light emission is obtained by exciting phosphors, a half-width of an emission spectrum of each of three primary colors is large, to degrade a color purity and a color reproducing characteristic. Liquid crystal displays have a disadvantage that since a half-width of an emission spectrum determined by a color filter is also large, to degrade a color purity and a color reproducing characteristic. Plasma displays have disadvantages that since light emission is obtained by exciting phosphors like cathode-ray tubes, a half-width of each emission spectrum is large, to degrade a color purity and a color reproducing characteristic, and that it is not easy to adjust gradation of an image.

On the other hand, as display units utilizing photonics, there are known display units using optical waveguides. Such a display unit, however, has a problem that a contrast ratio of light emergent in response to turn-on/turn-off of an optical switching device, that is, an optical switch such as liquid crystal is low. Further, an optical switch having a structure in which light transmissive layers are stacked has another problem that a slight change in light emergence efficiency depending on a thickness and a refractive index of each layer of the stacked structure may exert a large effect on an uniformity of the entire light emergence efficiency, and therefore, it is expected to provide an optical switch capable of easily realizing the uniformity of a light emergence efficiency.

An optical switch composed of an optical waveguide including at least a cladding layer, and a light directivity coupler having an electrode film, an alignment control film, and ferroelectric liquid crystal filled between a pair of substrates is known, for example, from Japanese Patent Laid-open No. Hei 8-36196. The design of this optical switch aims that a coupling efficiency (light emergence efficiency) becomes 1, that is, a transfer rate of light becomes 100% by optimizing a refractive index of liquid crystal, and with respect to such design of the optical switch, the above document describes that the coupling efficiency can reach 98% by setting an effective refractive index of liquid crystal to 1.523.

An optical switch designed to pursue a high coupling efficiency as the optical switch described in the above document, however, has a problem. Namely, a refractive index of each component such as ferroelectric liquid crystal, an optical waveguide, an electrode film, or an alignment control film may be deviated from a design value due to variations which occur depending on a thickness and a material characteristic of each layer in production steps, and if the refractive index of a component is deviated from a design value, then such a deviation cannot be canceled only by adjusting a refractive index of ferroelectric liquid crystal, and the coupling efficiency is largely degraded as the deviation in the refractive index of the component from the design value becomes large, thereby failing to obtain the uniformity of a light emergence efficiency.

SUMMARY OF THE INVENTION

An object of the present invention is to provide an optical switch capable of significantly improving a contrast ratio, obtaining a clear, bright image, and easily realizing the uniformity of a light emergence efficiency, and to provide a display unit using the optical switches.

To achieve the above object, according to a first aspect of the present invention, there is provided an optical switch for making part of incident light, which contains a specific polarized light component and has been made incident on an optical waveguide, selectively emergent from the optical waveguide to a light emergence portion provided outside the optical waveguide, the optical switch including: a multi-layer structure composed of a plurality of light transmissive layer; wherein letting $\sigma$ be a refractive index control accuracy at the time of producing the multi-layer structure, a refractive index of at least one light transmissive layer in the multi-layer structure is different from a refractive index of a light transmissive layer other than the at least one light transmissive layer in the multi-layer structure by $3\sigma$ or more.

According to a second aspect of the present invention, there is provided an optical switch for making part of incident light, which contains a specific polarized light component and has been made incident on an optical waveguide, selectively emergent from the optical waveguide to a light emergence portion provided outside the optical waveguide, the optical switch including: a light transmissive stacked structure including a function layer for selective emergence of the incident light; wherein letting $\Delta n$ be a difference between a refractive index $n_0$ of the optical waveguide and a refractive index $n_1$ of an arbitrary layer forming part of the stacked structure, "d" be a thickness of the arbitrary layer, and $\lambda$ be a wavelength of the incident light, the values of $\Delta n$, "d", and $\lambda$ satisfy a condition of $2.20 \times 10^{-3} \leq |\Delta n \cdot d \cdot \lambda^{-1}| \leq 3.03 \times 10^{-3}$.

According to the second aspect of the present invention, there is also provided a display unit including: a plurality of optical waveguides, disposed approximately in parallel to each other, for receiving light containing a specific polarized light component as incident light; one or two or more light emergence portions crossing the optical waveguides; and optical switches, disposed between the waveguides and the light emergence portions, for making part of the incident light selectively emergent from the optical waveguides to the light emergence portions provided outside the optical waveguides; wherein each of the optical switches has a light transmissive stacked structure including a function layer for selective emergence of the incident light; and letting $\Delta n$ be a difference between a refractive index $n_0$ of the optical waveguide and a refractive index $n_1$ of an arbitrary layer forming part of the stacked structure, "d" be a thickness of the arbitrary layer, and $\lambda$ be a wavelength of the incident light, the values of Δn, "d", and λ satisfy a condition of $2.20\times10^{-3} \leq |\Delta n \cdot d \cdot \lambda^{-1}| \leq 3.03\times10^{-3}$.

With these configurations of the second aspect of the present invention, in which a value of $\Delta n \cdot d \cdot \lambda^{-1}$ is specified, even if a refractive index of each layer of the light transmissive stacked structure of the optical switch is fluctuated, the light emergence efficiency is not varied so much. To be more specific, as a result of calculation, it is revealed that a small change region, in which the light emergence efficiency is not largely changed even if the refractive index $n_1$ of an arbitrary layer is fluctuated and is somewhat deviated from a design value, is present in the vicinity of a refractive index portion at which the light emergence efficiency is maximized. By making effective use of such a small change region, it is possible to suppress a variation in light emergence efficiency even if the refractive index of an arbitrary layer is varied. The small change region in which the light emergence efficiency is not largely changed appears under a condition that a deviation in phase of light passing through an arbitrary layer (refractive index: n1, and thickness: "d") is within a specific range. A value of $\Delta n \cdot d \cdot \lambda^{-1}$ expresses the deviation in phase of transmission light, and the above condition for suppressing the light emergence efficiency by making use of the small change region is given by an expression of $2.20\times10^{-3} \leq |\Delta n \cdot d \cdot \lambda^{-1}| \leq 3.03\times10^{-3}$. The uniformity of the light emergence efficiency can be realized by setting the arbitrary layer under the above condition.

According to a third aspect of the present invention, there is provided an optical switch for making part of incident light, which contains a specific polarized light component and has been made incident on an optical waveguide, selectively emergent from the optical waveguide to a light emergence portion provided outside the optical waveguide, the optical switch including: a light transmissive stacked structure including a function layer for selective emergence of the incident light; wherein letting L μm be a length of the function layer in the longitudinal direction of the optical waveguide, a thickness of the optical waveguide is in a range of 0.05·L μm to 0.2·L μm.

According to the third aspect of the present invention, there is also provided a display unit including: a plurality of optical waveguides, disposed approximately in parallel to each other, for receiving light containing a specific polarized light component as incident light; one or two or more light emergence portions crossing the optical waveguides; and optical switches, disposed between the waveguides and the light emergence portions, for making part of the incident light selectively emergent from the optical waveguides to the light emergence portions provided outside the optical waveguides; wherein each of the optical switches has a light transmissive stacked structure including a function layer for selective emergence of the incident light; and letting L μm be a length of the function layer in the longitudinal direction of the optical waveguide, a thickness of the optical waveguide is in a range of 0.05·L μm to 0.2·L μm.

With these configurations of the third aspect of the present invention, in which a thickness of an optical waveguide is specified, a light intensity at one optical switch or at one pixel can be set to a high value. To be more specific, if the thickness of the optical waveguide is excessively thin as compared with a size of a function layer for selective emergence of the incident light in the optical switch, a mode number of a spectrum of light allowed to enter the optical waveguide is reduced, so that it is difficult to obtain a sufficient light intensity. On the other hand, if the thickness of the optical waveguide is excessively thick as compared with the size of the function layer, the probability that a light ray of one mode enters the function layer of one optical switch is reduced, so that it is impossible to obtain a sufficient light intensity even by performing selective emergence of light. Accordingly, to optimize the light intensity, it may be desirable to specify a range of the thickness of the optical waveguide. To be more specific, letting L μm be a length of the function layer in the longitudinal direction of the optical waveguide, the thickness of the optical waveguide may be set in a range of 0.05·L μm to 0.2·L μm in order to optimize the light intensity.

According to a fourth aspect of the present invention, there is provided an optical switch for making part of incident light, which contains a specific polarized light component and has been made incident on an optical waveguide, selectively emergent from the optical waveguide to a light emergence portion provided outside the optical waveguide, the optical switch including: a light transmissive stacked structure including a function layer for selective emergence of the incident light; wherein letting Δn be a difference between a refractive index $n_0$ of the optical waveguide and a refractive index $n_1$ of an arbitrary layer forming part of the stacked structure, "d" be a thickness of the arbitrary layer, and λ be a wavelength of the incident light, the values of Δn, "d", and λ satisfy a condition of $|\Delta n \cdot d \cdot \lambda^{-1}| \leq 3.03\times10^{-3}$ and $|\Delta n \cdot d \cdot \lambda^{-1}| \neq 0$.

With this configuration of the fourth aspect of the present invention, since the range of a deviation in phase of transmission light, which is expressed by $\Delta n \cdot d \cdot \lambda^{-1}$, is extended, the production of an optical switch becomes easier than the production of the optical switch under the above-described condition specified according to the second aspect of the present invention. In addition, since a value of Δn may become negative, the deviation in phase of transmission light is expressed by an absolute value of $\Delta n \cdot d \cdot \lambda^{-1}$.

BRIEF DESCRIPTION OF THE DRAWINGS

FIG. 10 is a graph showing a relationship between a supplementary angle and a mode number in the case where laser light is made incident on an optical waveguide according to the second embodiment of the present invention;

FIG. 12 is a graph showing a relationship between a light intensity and a thickness of an optical waveguide in the case where laser light is made incident on the optical waveguide according to the second embodiment of the present invention.

DETAILED DESCRIPTION OF THE PREFERRED EMBODIMENTS

An optical switch and a display unit using the optical switches according to the present invention will be hereinafter described in detail with reference to the accompanying drawings, in which preferred embodiments are shown.

According to a first embodiment, there is provided an optical switch for making part of incident light, which contains a specific polarized light component and has been made incident on an optical waveguide, selectively emergent from the optical waveguide to a light emergence portion provided outside the optical waveguide. The optical switch includes a multi-layer structure composed of a plurality of light transmissive layer. In this optical switch, letting $\sigma$ be a refractive index control accuracy at the time of producing the multi-layer structure, a refractive index of at least one light transmissive layer in the multi-layer structure is different from a refractive index of a light transmissive layer, other than said at least one light transmissive layer in the multi-layer structure, by $3\sigma$ or more.

According to the first embodiment, there is also provided an optical switch for making part of incident light, which contains a specific polarized light component and has been made incident on an optical waveguide, selectively emergent from the optical waveguide to a light emergence portion provided outside the optical waveguide. The optical switch includes a light transmissive stacked structure including a function layer for selective emergence of the incident light. In this optical switch, letting $\Delta n$ be a difference between a refractive index $n_0$ of the optical waveguide and a refractive index $n_1$ of an arbitrary layer forming part of the stacked structure, "d" be a thickness of the arbitrary layer, and $\lambda$ be a wavelength of the incident light, the values of $\Delta n$, "d", and $\lambda$ satisfy a condition of $2.20 \times 10^{-3} \leq |\Delta n \cdot d \cdot \lambda^{-1}| \leq 3.03 \times 10^{-3}$.

The optical switch in this embodiment is provided with an optical waveguide, and if a display unit is composed of a plurality of the optical switches, then a plurality of optical waveguides, each of which is formed into a flat plate shape, are arrayed.

Figure 1:
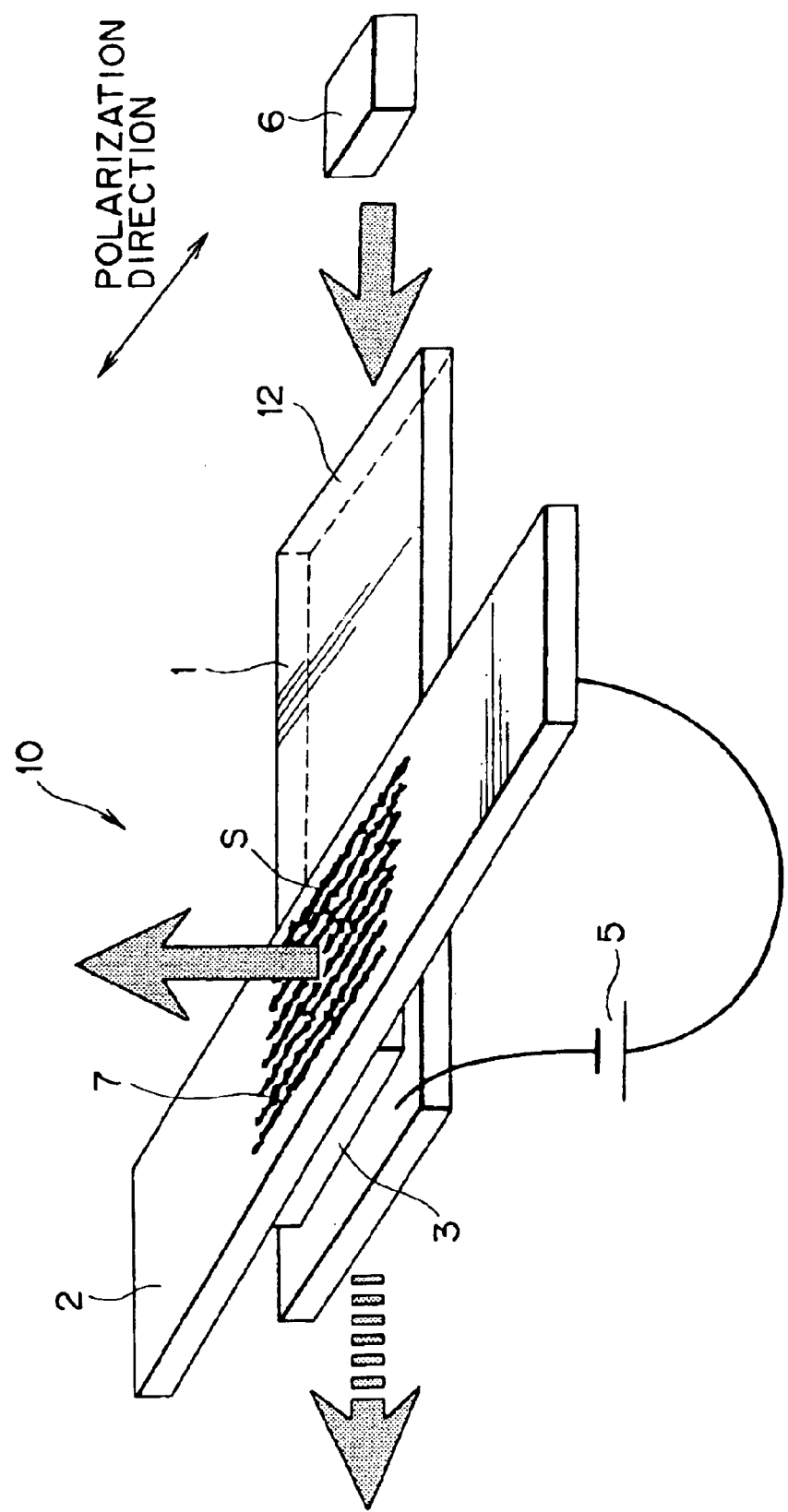
FIG. 1 is a schematic perspective view showing a structure of an optical switch according to a first embodiment of the present invention.

FIG. 1 is a typical perspective view showing a structure of an optical switch. An optical waveguide 1 is formed of a plate-like member made from a polycarbonate based resin. Light emitted from a light source 6 such as a semiconductor laser is made incident on an end face 12 of the optical waveguide 1. The optical waveguide 1 crosses a light emergence portion 2 formed into a flat-plate shape like the optical waveguide 1. At a portion where the optical waveguide 1 crosses the light emergence portion 2, a liquid crystal device 3 is held between the optical waveguide 1 and the light emergence portion 2.

The light source 6 used for the optical switch 10 is not limited to the above-described semiconductor laser but may be an LED (Light Emitting Diode) light source or an EL (Electroluminescence) light source. In the case of using light containing a specific polarized light component, a sheet polarizer may be used. The above-described light source is advantageous in that a half-width of an emission spectrum is relatively small and thereby a color purity is excellent. Accordingly, the use of such a light source is effective to produce a desirable three primary color display unit.

The optical waveguide 1 may be made from a light transmissive material having desired rigidity, flexibility, and heat resistance, for example, a polycarbonate based resin. The material for the optical waveguide 1, however, is not limited thereto but may be any other transparent synthetic resin or quartz glass. In this embodiment, the optical waveguide 1 is formed into an elongated flat plate shape. The shape of the optical waveguide 1, however, is not limited thereto but may be a round bar shape or a square bar shape. The optical waveguide 1 may be configured as optical fibers.

The liquid crystal device 3 formed between the optical waveguide 1 and the light emergence portion 2 has a function layer for selective emergence of incident light. An operational mode of the function layer can be selectively changed into either a total reflection mode for allowing total reflection of incident light in the optical waveguide 1 or an emission mode for allowing emission of incident light via the liquid crystal device 3. The selective control of the liquid crystal device 3 is performed by changing a voltage 5 applied to the liquid crystal device 3. In the emission mode, the waveguided light emerges upward from an upper surface of the liquid crystal device 3. To increase an light emergence efficiency from the liquid crystal device 3, a grating 7 is mounted on the upper surface of the light emergence portion 2. The liquid crystal device 3 has a light transmissive stacked structure (which will be described later), and is operated for selective emergence of incident light. It is to be noted that the device having a function layer, used for the optical switch in this embodiment, is not limited to the liquid crystal device 3 but may be one kind or a combination of two or more kinds selected from a group consisting of layers capable of, depending on a change in electric field or light, modulating a refractive index, a refractive index distribution, an emission intensity, a color density, a dielectric constant, and a permeability, and layers capable of, depending on a change in electric field or light, changing a liquid crystal alignment state, and scattering light. Such a device having a function layer allows selective emergence or cutoff of light. In particular, in the case of using the liquid crystal device 3 as the device having a function layer of the optical switch as in this embodiment, the liquid crystal device 3 may be desirable to have ferroelectric liquid crystal.

Figure 2:
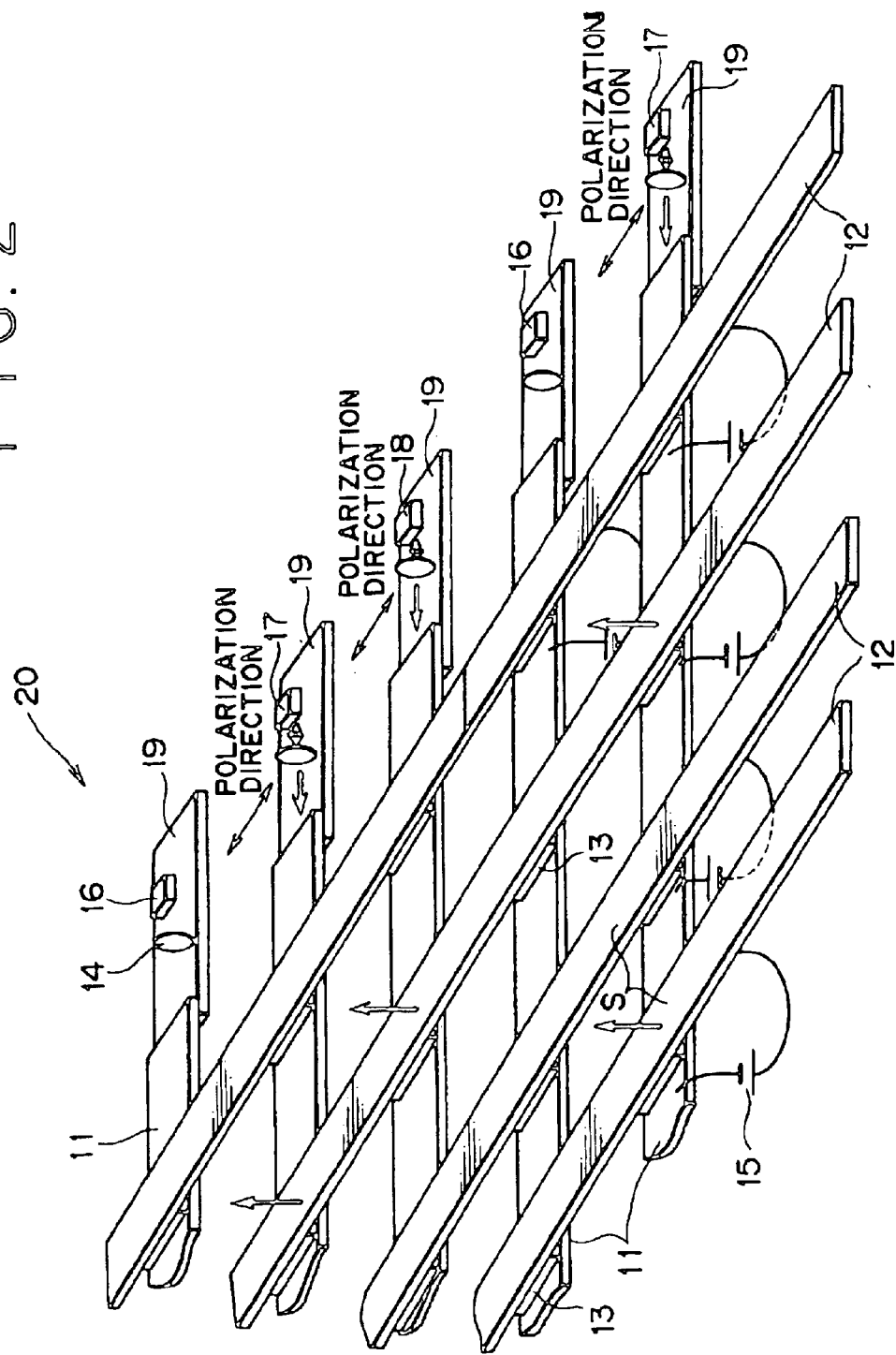
FIG. 2 is a schematic perspective view showing a structure of a display unit using the optical switches according to the first embodiment of the present invention.

FIG. 2 shows a flat type display unit 20 including optical switches arrayed within a flat plane. A plurality of optical waveguides 11 typically made from polycarbonate resin extend in the horizontal direction within a flat plane in such a manner as to be spaced from each other at specific intervals, and a plurality of flat plate shaped narrow light emergence portions 12 extend in such a manner as to cross the optical waveguides at right angles. Liquid crystal devices 13 are disposed at portions where the plurality of optical waveguides 11 cross the plurality of light emergence portions 12. The liquid crystal device 13 has a function layer for selective emergence of incident light. An operational mode of the liquid crystal device 13 can be selectively changed into either a total reflection mode for allowing total reflection of incident light in the optical waveguide 11 or an emission mode for allowing emission of incident light via the liquid crystal device 13 by changing a voltage 15 applied to the liquid crystal device 13.

An approximately flat plate shaped base 19 is mounted on a base end side of each optical waveguide 11, and each of semiconductor lasers 16, 17 and 18 corresponding to respective emission colors is mounted on an upper surface of the base 19 in such a manner that the emission side of the semiconductor laser is directed toward an end face of the corresponding optical waveguide 11. A lens 14 is provided between each of the semiconductor lasers 16, 17 and 18 and the end face of the corresponding optical waveguide 11. Laser light emitted from each of the semiconductor lasers 16, 17 and 18 is made incident on the end face of the corresponding optical waveguide 11 via the lens 14. The semiconductor lasers 16, 17 and 18 corresponding to respective emission colors are typically configured as lasers capable of emitting laser light of red, green and blue in this order, and the optical waveguides 11 corresponding to the semiconductor lasers 16, 17 and 18 waveguide the incident laser light of red, green and blue, respectively. For example, by arraying 4,800 pieces of the optical waveguides in the horizontal direction on a display screen and arraying 1,200 pieces of light emergence portions in the vertical direction on the display screen, a full color display unit having 1,920,000 pixels can be realized.

As a preferred example of the semiconductor laser or light emitting diode used for the present invention, an AlGaInP based group III–V semiconductor light emitting device is used as a red light source, a ZnSe based group II–VI semiconductor light emitting device or a GaN based group III–V semiconductor light emitting device is used as a green light source, and a ZnSe based group II–VI semiconductor light emitting device or a GaN based group III–V semiconductor light emitting device is used as a blue light source. Further, as a preferred example of an electroluminescence light emitting device used for the present invention, a ZnS based light emitting device is used as each of a red light source, a green light source, and a blue light source.

The use of a soft material such as a plastic material as a display unit forming material can realize display units of the optical waveguide type which have various sizes from a large size to a compact size, for example, a curved display having a punchy screen spread at a wide angle of typically 120°, a semi-spherical display, a full-spherical display, a cocoon type display, and a display allowed to be hoisted not at the time of use.

Figure 3:
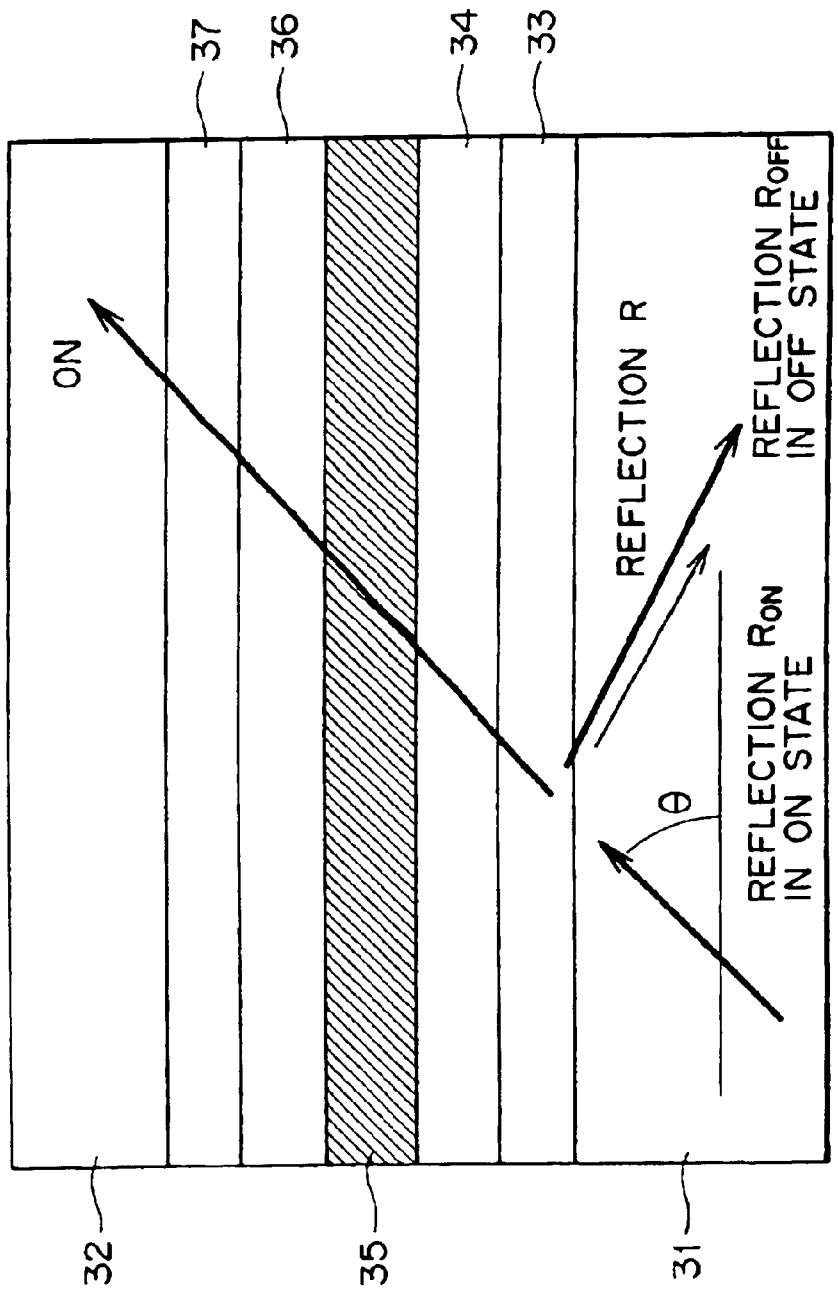
FIG. 3 is a typical sectional view showing a cross-sectional structure of the optical switch according to the first embodiment of the present invention.

An essential structure of a liquid crystal type optical switch according to this embodiment will be described with reference to FIG. 3. As shown in FIG. 3, the essential structure of the liquid crystal type optical switch includes a stacked structure in which a liquid crystal device is held between an optical waveguide 31 and a light emergence portion 32. To be more specific, alignment films 34 and 36 are formed between transparent electrode layers 33 and 37, and a liquid crystal layer 35 is formed between the alignment films 34 and 36. Each of the optical waveguide 31 and the light emergence portion 32 is, as described above, typically made from a light transmissive polycarbonate based resin, and in this case, a refractive index $n_0$ thereof is set to 1.585. Each of the transparent electrode layers 33 and 37 is made from typically an ITO film, and in this case, a refractive index thereof is set to the same value as that of the optical waveguide 31, that is, 1.585. However, as will be described later, according to the structure in this embodiment, even if the refractive index of each of the transparent electrode layers 33 and 37 is somewhat deviated from a setting value, the light emergence efficiency is not reduced. A thickness of each of the transparent electrodes 33 and 37 is typically set to 0.50 $\mu$m. A mode of the liquid crystal layer 35 is selected in response to a voltage applied between the transparent electrode layers 33 and 37.

The alignment layers 34 and 36, each of which is typically made from a polyimide based resin, are formed on the transparent electrode layer 33 and under the transparent electrode layer 37, respectively. A refractive index of each of the alignment films 34 and 36 is set to be larger than the refractive index $n_0$ of each of the optical waveguide 31 and the light emergence portion 32 by a value of about 0.05 to 0.15. In general, a refractive index of a glass material is controlled at an accuracy of five decimal places, and a refractive index of an organic material such as a synthetic resin is controlled at an accuracy of four decimal places. Letting $\sigma$ be a refractive index control accuracy at the time of producing the multi-layer structure, a value of $3\sigma$ is in the order of three decimal places at maximum, and accordingly, a deviation of a refractive index in a range of about 0.05 to 0.15 largely exceeds the value of $3\sigma$, that is, largely exceeds an error range at the time of producing the multi-layer structure. A thickness of each of the alignment films 34 and 36 is set to 0.142 $\mu$m.

Figure 4:
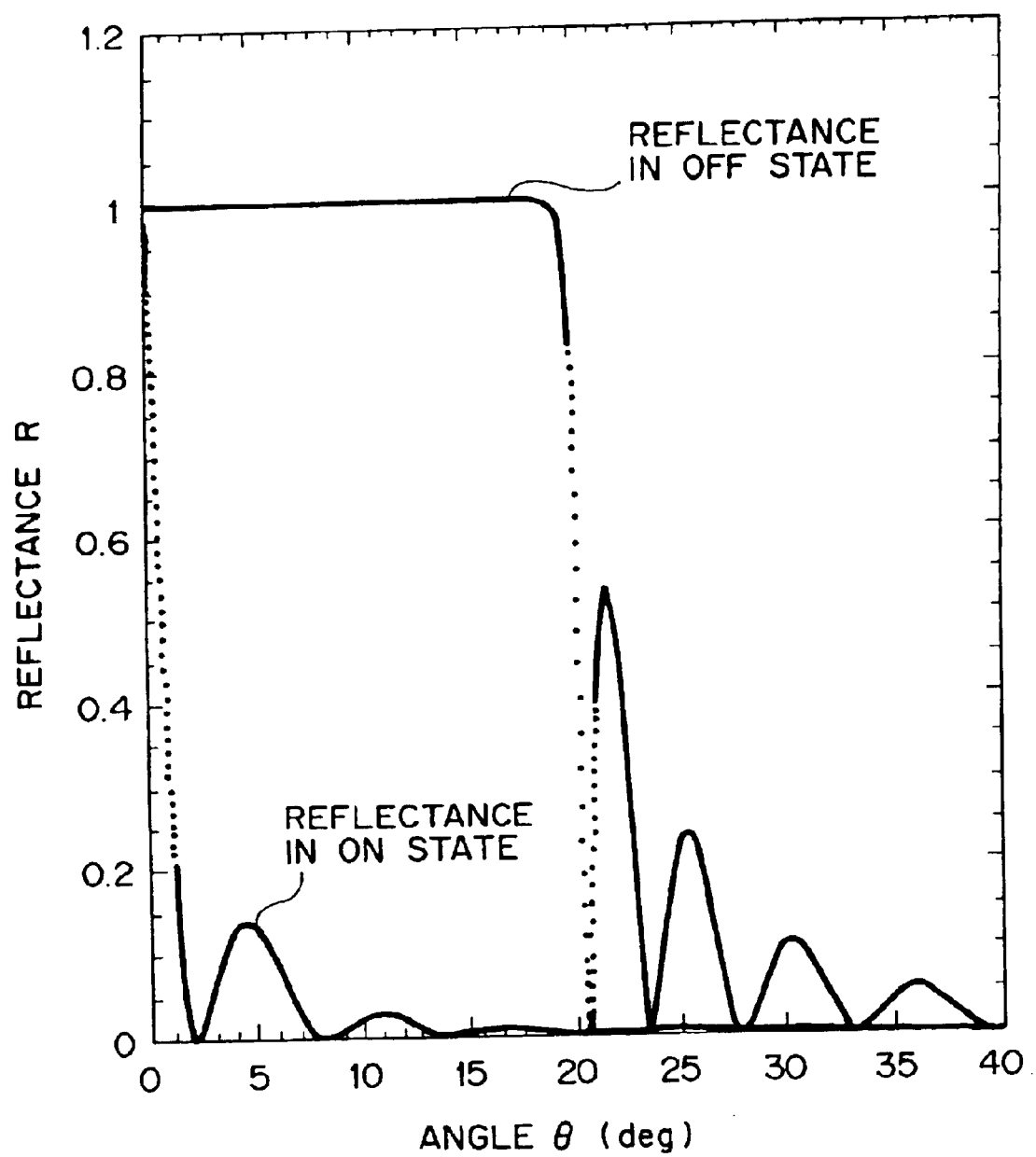
FIG. 4 is a graph showing a relationship between a supplementary angle and a reflectance in the optical switch according to the first embodiment of the present invention.

The liquid crystal layer 35 is a function layer for selective transmission of incident light, and a reflectance of the liquid crystal layer 35 is largely changed in response to a voltage applied between the transparent electrode layers 33 and 37. In this embodiment, ferroelectric liquid crystal is used for the liquid crystal layer 35, and in the ON state of the liquid crystal, light in the optical waveguide 31 reaches the light emergence layer 32, and in the OFF state of the liquid crystal, light in the optical waveguide 31 is cutoff by the liquid crystal layer 35 and thereby the light does not reach the light emergence layer 32. FIG. 4 shows a reflectance R of the liquid crystal layer. In a range of a supplementary angle $\theta$ (to a reflection angle) of 20° or less, in the OFF state of liquid crystal, the reflectance R of the liquid crystal layer becomes a value closer to an approximately 1, and in the ON state of liquid crystal, the reflectance R of the liquid crystal layer becomes 0.2 or less, that is, substantially zero.

The feature of the optical switch in this embodiment lies in that even if a refractive index and a thickness of an arbitrary layer are deviated, a light emergence efficiency can be uniformly retained. This feature will be described below. Since the optical switch in this embodiment has the structure in which respective light transmissive layers are stacked, refractive indexes of these layers exert effects on a light emergence efficiency of the entire optical switch. The condition under which the efficiency is maximized, that is, the light emergence efficiency $\eta$ is set to 1 can be established by making a refractive index of each of the layers identical to the refractive index $n_0$ of the optical waveguide. Such a condition is effective to design an optical switch capable of maximizing the light emergence efficiency. The adoption of such a maximum efficiency condition, however, causes a problem. Namely, under a condition closer to the maximum efficiency condition that the light emergence efficiency $\eta$ becomes 1, even if a refractive index of a layer is slightly deviated from a design value, the light emergence efficiency $\eta$ is largely deviated from 1. As a result, for a display unit on which optical switches are arrayed within a flat plane, variations between the optical switches become significantly large. To cope with such a problem, according to this embodiment, in place of adopting a maximum efficiency portion for a stacked structure of an optical switch, a small change region closer to the maximum efficiency portion, in which the light emergence efficiency η is not largely changed even if a refractive index of a layer is deviated, is positively utilized for a stacked structure of an optical switch.

Figure 5:
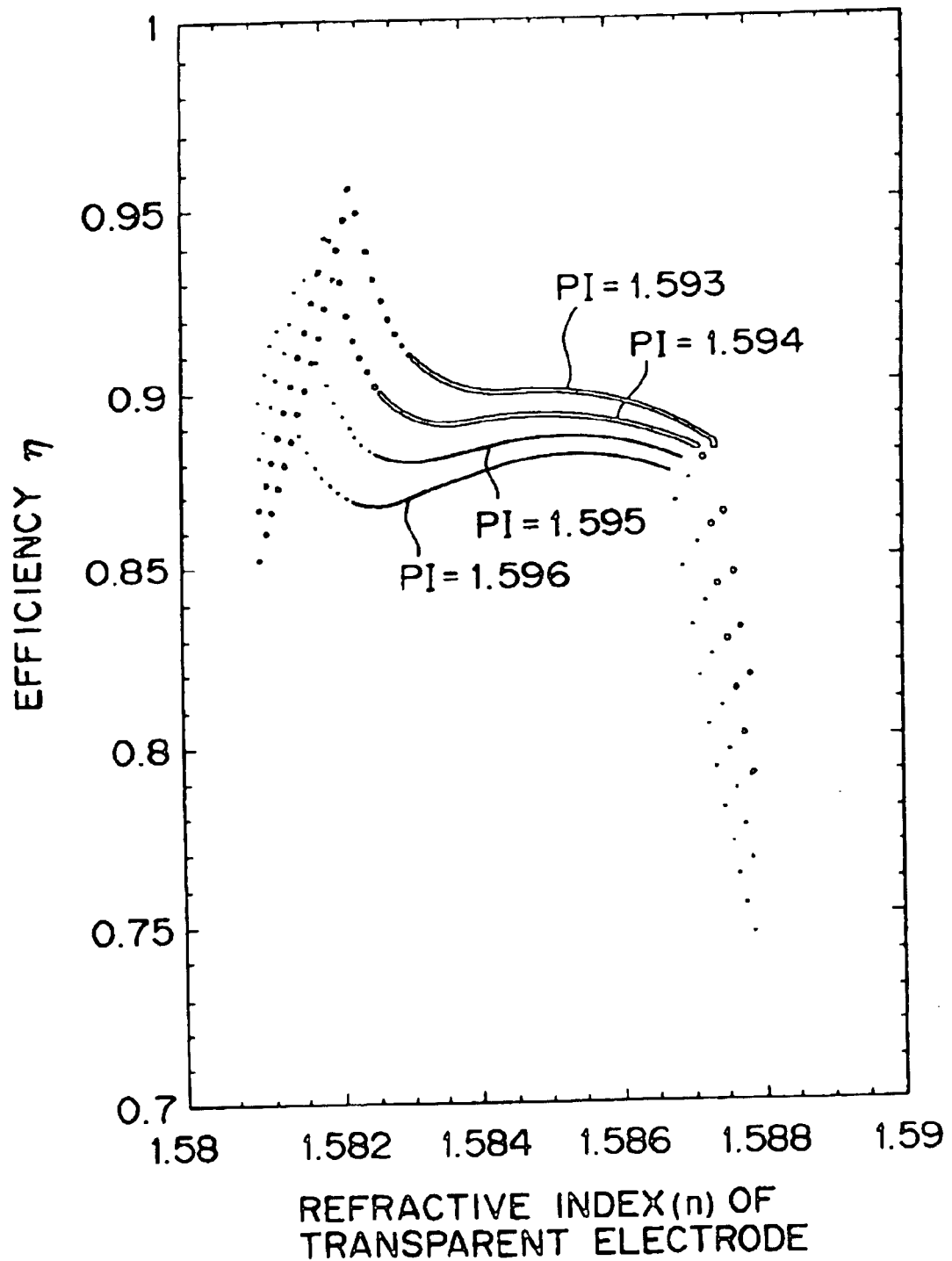
FIG. 5 is a graph showing a relationship between a refractive index of a transparent electrode and a light emergence efficiency in the optical switch according to the first embodiment of the present invention.

FIG. 5 is a graph showing a change in light emergence efficiency η depending on a deviation in refractive index of a transparent electrode. As is apparent from this graph, each of four curves has the above-described small change region. In addition, data shown in the graph are obtained for the same structure as that shown in FIG. 3, in which a transparent electrode layer having a refractive index "n", and an alignment film having a refractive index PI are formed on an optical waveguide having a refractive index $n_0$. More specifically, the four curves show the data for the four structures in which the refractive indexes PI of the alignment film are 1.593, 1.594, 1.595, and 1.596, respectively. In the graph, the ordinate designates the light emergence efficiency η and the abscissa designates the refractive index "n" of the transparent electrode layer. In each of the four curves shown in FIG. 5, the small change region, in which even if the refractive index "n" is varied, the light emergence efficiency η is not largely changed, is present in a range which is larger than the refractive index corresponding to the maximum efficiency by about 0.002. An optical switch using such a small change region makes it possible to suppress a variation in light emergence efficiency η even if the refractive index "n" is varied, and a display unit capable of keeping the uniformity of the light emergence efficiency η can be obtained by using such optical switches.

Figure 6:
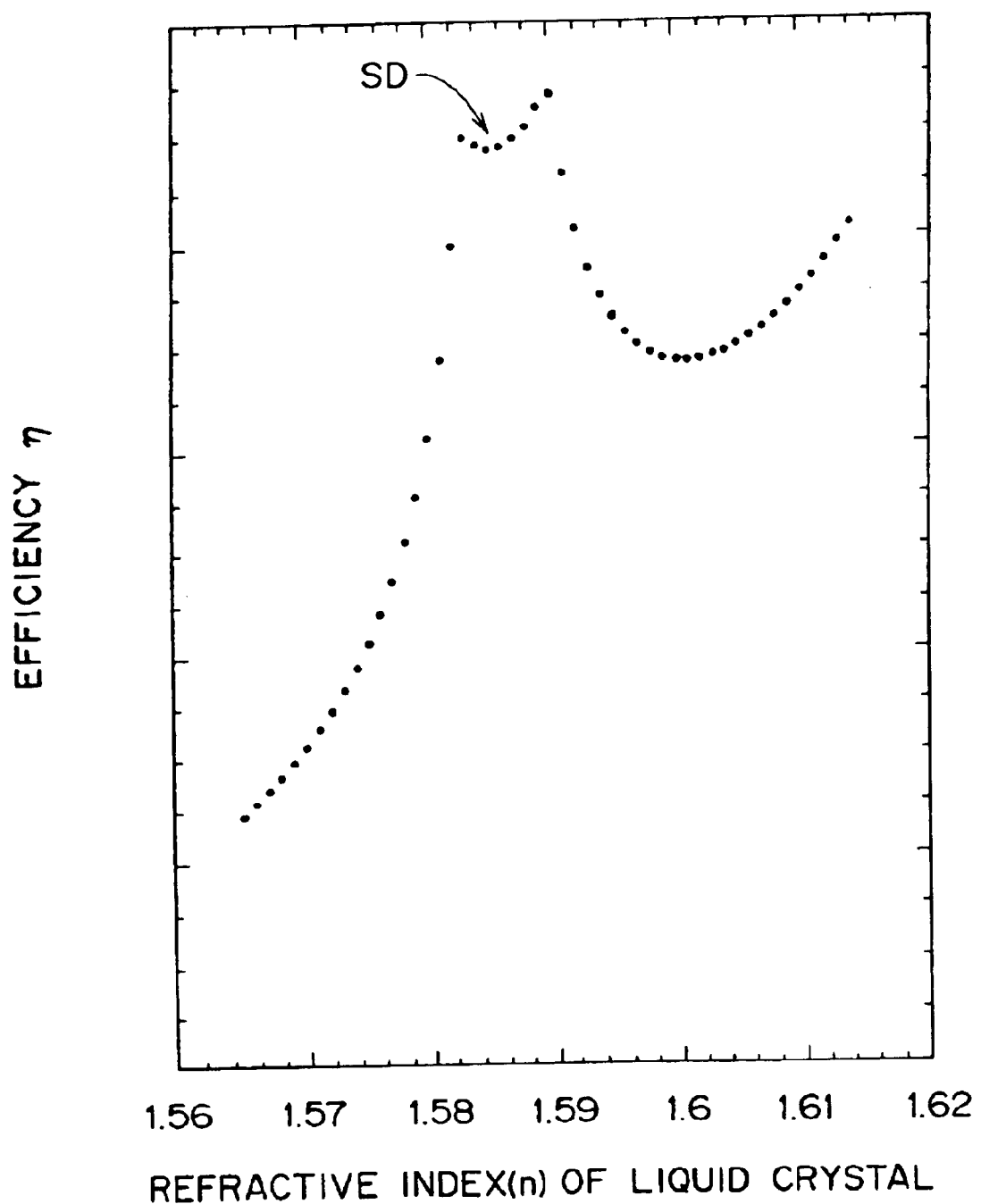
FIG. 6 is a graph showing a relationship between a refractive index of liquid crystal and a light emergence efficiency in the optical switch according to the first embodiment of the present invention.

Like the example shown by the graph in FIG. 5 in which the refractive index of the transparent electrode is deviated, a small change region is present in which even if a refractive index of a liquid crystal layer is deviated, the light emergence efficiency η is not largely changed. FIG. 6 shows a change in light emergence efficiency η depending on a variation in refractive index of the liquid crystal layer. As shown in FIG. 6, in a range of a refractive index of an alignment film from 1.565 to 1.610, a small change region SD, in which the light emergence efficiency η is not largely changed, is present on the side slightly smaller than the refractive index corresponding to the maximum efficiency. An optical switch using such a small change region makes it possible to suppress a variation in light emergence efficiency η even if the refractive index of the liquid crystal layer is varied, and a display unit capable of keeping the uniformity of the light emergence efficiency η can be obtained by using such optical switches.

Figure 7:
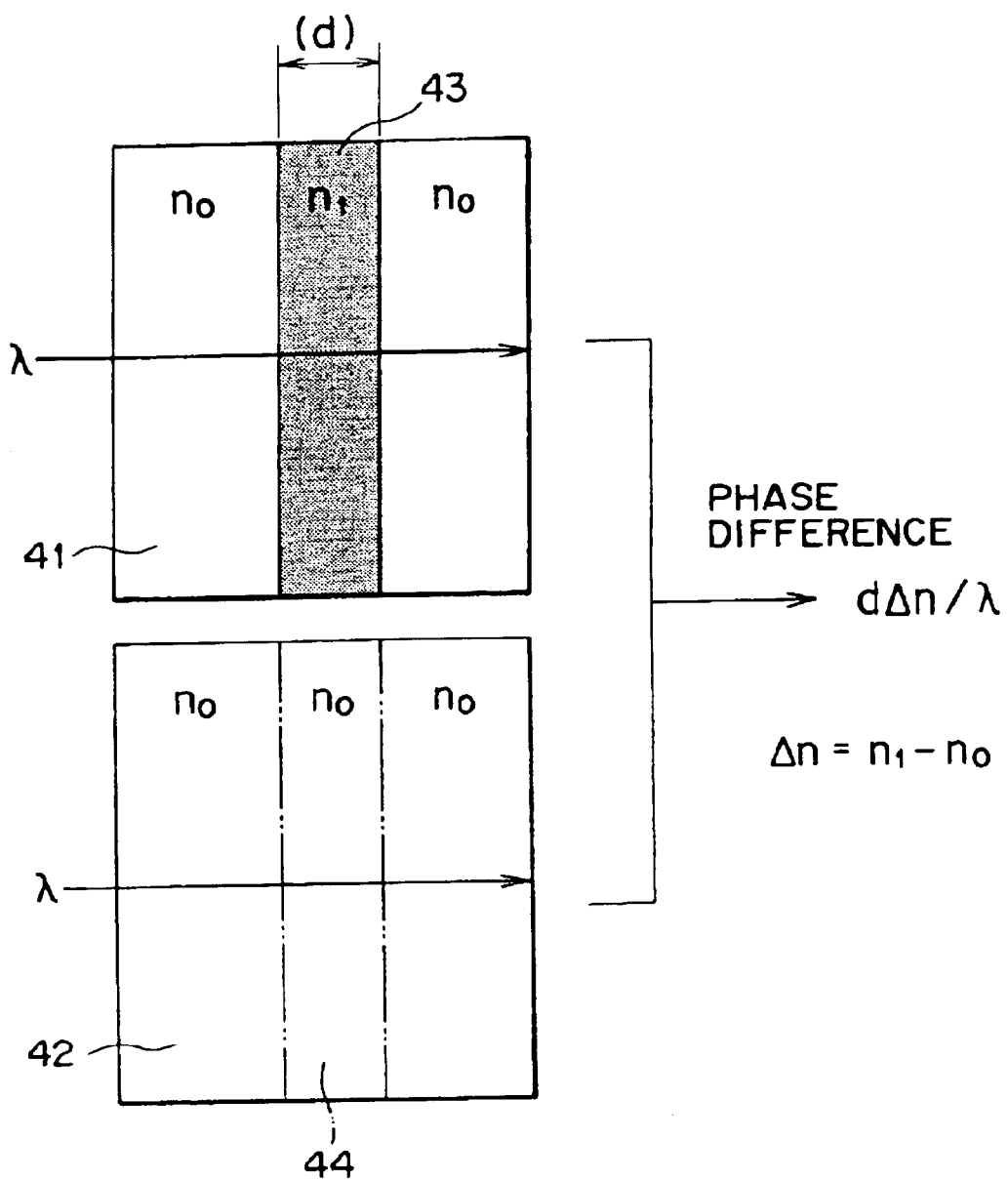
FIG. 7 is a typical view illustrating a phase difference of an optical switch structure.

The condition under which such a small change region appears will be more fully described below. In general, the light emergence efficiency η is not determined only by a deviation from the perfect structure composed of all layers whose refractive indexes are perfectly identical to each other, but is determined by the deviation in refractive index of a layer multiplied by a thickness of the layer. To be more specific, a value obtained by dividing a product of a deviation in refractive index $\Delta n$ (=$n_0 - n_1$) and a thickness "d" by a wavelength λ becomes a deviation in phase α, and the deviation in phase α determines the reflectance and the light emergence efficiency η. This is typically shown in FIG. 7. Referring to this figure, light passes through two media 41 and 42. In this case, assuming that an intermediate portion 43 of the medium 41 has a thickness "d" and a refractive index $n_1$ and an intermediate portion 44 of the medium 42 has a thickness "d" and a refractive index $n_0$, a phase difference caused by transmission of light through the media 41 and 42 having different refractive indexes is expressed by $d \cdot \Delta n \cdot \lambda^{-1}$. Such a phase difference $d \cdot \Delta n \cdot \lambda^{-1}$ becomes a factor determining the light emergence efficiency η.

On the other hand, as a result of a plurality of simulation tests carried by the present inventors, it is revealed that $d \cdot \Delta n = 1.278 \times 10^{-3}$ μm becomes a condition under which the above-described small change region appears. Hereinafter, a condition under which the above-described small change region appears will be more fully described by using the data shown in FIG. 5. FIG. 5 shows the result which is calculated with the wavelength λ fixed at 0.515 μm, the thickness "d" of the alignment film fixed at 0.142 μm, and the refractive index n0 of the optical waveguide fixed at 1.585, and the refractive index nPI of the alignment film varied in a range of 1.593 to 1.596. Accordingly, in the case of the refractive index nPI=1.593, Δn (=nPI−n0) becomes 0.008, with a result that $d \cdot \Delta n \cdot \lambda^{-1}$ becomes $2.20 \times 10^{-3}$, and in the case of the refractive index nPI=1.596, Δn (=nPI−n0) becomes 0.011, with a result that $d \cdot \Delta n \cdot \lambda^{-1}$ becomes $3.03 \times 10^{-3}$. Consequently, a condition of $2.20 \times 10^{-3} \leq |\Delta n \cdot d \cdot \lambda^{-1}| \leq 3.03 \times 10^{-3}$ is obtained. In other words, by setting the refractive index "n" and the thickness "d" of the transparent electrode layer, and further the wavelength λ of transmission light under the condition of $2.20 \times 10^{-3} \leq |\Delta n \cdot d \cdot \lambda^{-1}| \leq 3.03 \times 10^{-3}$, the above small change region appears. As a result, it is possible to obtain the light emergence efficiency η not largely changed even if the refractive index "n" of the transparent electrode layer is varied. Concretely, as shown by the data in FIG. 5, by satisfying the condition of $2.20 \times 10^{-3} \leq |\Delta n \cdot d \cdot \lambda^{-1}| \leq 3.03 \times 10^{-3}$, the light emergence efficiency η is little changed even if the refractive index of the transparent electrode is deviated from 1.585 by a value of about ±0.0015. In addition, since the value of Δn may becomes negative, the deviation in phase of transmission light is expressed by the absolute value of $\Delta n \cdot d \cdot \lambda^{-1}$.

In the above example, the condition of the transparent electrode layer, under which the small change region can be obtained, is calculated with the refractive index of the alignment film taken as a parameter. The same consideration can be applied to the liquid crystal layer. That is to say, by setting the liquid crystal layer under the condition of $2.20 \times 10^{-3} \leq |\Delta n \cdot d \cdot \lambda^{-1}| \leq 3.03 \times 10^{-3}$, a small change region appears. As a result, it is possible to obtain the light emergence efficiency η not largely changed even if the refractive index of the liquid crystal layer is varied. For example, it is revealed that by setting, at the wavelength of 0.515 μm, the refractive index of the alignment film to be higher than the refractive index of the optical waveguide by about 0.01, a small change region in which the light emergence efficiency η is not largely changed appears. In this case, even if the refractive index of the liquid crystal layer is changed from 1.582 to 1.585, a variation in light emergence efficiency η can be suppressed to a value of 2% or less.

The transparent electrode is not limited to the above-described ITO film but may be a fine particle dispersion type transparent electrode film. The fine particle dispersion type transparent electrode film is a conductive film obtained by mixing a high refractive index material such as $SnO_2$ fine particles with a low refractive index material such as a polyester based resin. To control a refractive index of the conductive film, it is required to mix the $SnO_2$ fine particles with the polyester based resin at a specific mixing ratio For example, a refractive index n1 of the $SnO_2$ fine particles is 2.0, and a refractive index n2 of the polyester based resin is 1.45. In this case, a refractive index n3 of the mixture of the two kinds of materials is determined by a volume ratio "k" of the materials. Here, letting V1 be the total volume of the fine particles and V2 be the total volume of the polyester based resin, the volume ratio "k" becomes k=V1/(V1+V2) The refractive index n3 of the mixture thus becomes n3=k× n1+(1−k)×n2. As a result, for example, to set the refractive index n3 to 1.585, "k" must be set to 0.2455. In this case, if the volume V1 of the fine particles is set to 10 mL, the volume V2 of the polyester based resin becomes 30.73 mL.

In this way, a designed refractive index of the mixture is obtained by mixing the fine particles with the resin at a specific volume ratio. This method can be applied to a combination of other materials. Since a refractive index of a mixture is determined by a volume ratio, even if the mixture is composed of not two kinds but three or more kinds of materials, a desired refractive index of the mixture can be obtained in accordance with the same manner. According to this embodiment, even if a refractive index of a transparent electrode film is somewhat varied, a variation in light emergence efficiency η can be suppressed, and consequently, the fine particle dispersion type transparent electrode film produced by mixing a high refractive index material with a low refractive index material at a specific volume ratio is significantly effective.

The refractive index $n_0$ of the optical waveguide 31 shown in FIG. 3 is not limited to 1.585 but may be more generalized. For example, the refractive index $n_0$ may be set to a value in a range of 1.57 to 1.60. On the optical waveguide 31 having the refractive index $n_0$ ranging from 1.57 to 1.60, at least one layer or two layers each having a refractive index ranging from 1.594 to 1.595 and a thickness ranging from 0.13 μm to 0.16 μm may be formed as the alignment film 34 and 36 or the transparent electrode layers 33 and 37. Further, the above-described condition of $2.20 \times 10^{-3} \leq |\Delta n \cdot d \cdot \lambda^{-1}| \leq 3.03 \times 10^{-3}$ may be replaced with a condition of $|\Delta n \cdot d \cdot \lambda^{-1}| \leq 3.03 \times 10^{-3}$ and $|\Delta n \cdot d \cdot \lambda^{-1}| \neq 0$. Under the condition of $|\Delta n \cdot d \cdot \lambda^{-1}| \leq 3.03 \times 10^{-3}$ and $|\Delta n \cdot d \cdot \lambda^{-1}| \neq 0$, since a deviation in phase of transmission light expressed by $\Delta n \cdot d \cdot \lambda^{-1}$ is extended, the production of an optical switch becomes easier than the production of the optical switch under the condition of $2.20 \times 10^{-3} \leq |\Delta n \cdot d \cdot \lambda^{-1}| \leq 3.03 \times 10^{-3}$. In addition, since a value of Δn may become negative, the deviation in phase of transmission light is expressed by an absolute value of $\Delta n \cdot d \cdot \lambda^{-1}$.

According to the optical switch and the display unit using the optical switches in this embodiment, even if a refractive index of an arbitrary layer of a stacked structure constituting the optical switch is varied, a uniform light emergence efficiency η can be obtained by setting the arbitrary layer such that the arbitrary layer satisfies a specific condition. The specific condition is established by setting the phase difference $\Delta n \cdot d \cdot \lambda^{-1}$ of transmission light in a specific range. In particular, since the condition is dependent on $\lambda^{-1}$, that is, the inverse of the wavelength of transmission light, the structure of the optical switch is also dependent on the wavelength of transmission light. Accordingly, in the case of producing a display unit using the optical switches in this embodiment, as shown in FIG. 2, the wavelength of light used is determined for each optical waveguide, and the optical switches corresponding to the light emitting devices for emission of red, green and blue are disposed so as to correspond to the optical waveguides. In other words, in a full color display unit, optical waveguides for waveguiding light of different colors are arrayed, and each of the optical switches, which is different from that adjacent thereto in terms of at least one of a thickness and a refractive index of a layer forming the optical switch, is provided so as to correspond to a wavelength of light emitted from each light emitting device. For example, in an optical switch for receiving light of red, since the wavelength of the light of red is longer than that of light of blue, a thickness of a layer forming the optical switch may be made thicker than a layer forming an optical switch for receiving light of blue. With this configuration, it is possible to extend the uniformity over the screen.

Figure 8A:
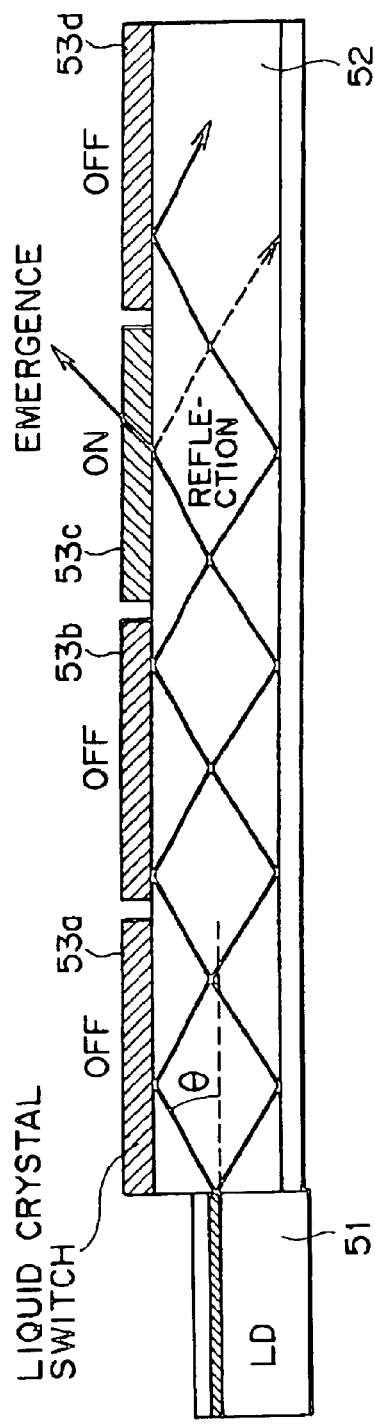
FIGS. 8A and 8B are schematic sectional views each showing an optical waveguide and an optical switch structure according to a second embodiment of the present invention.
Figure 8B:
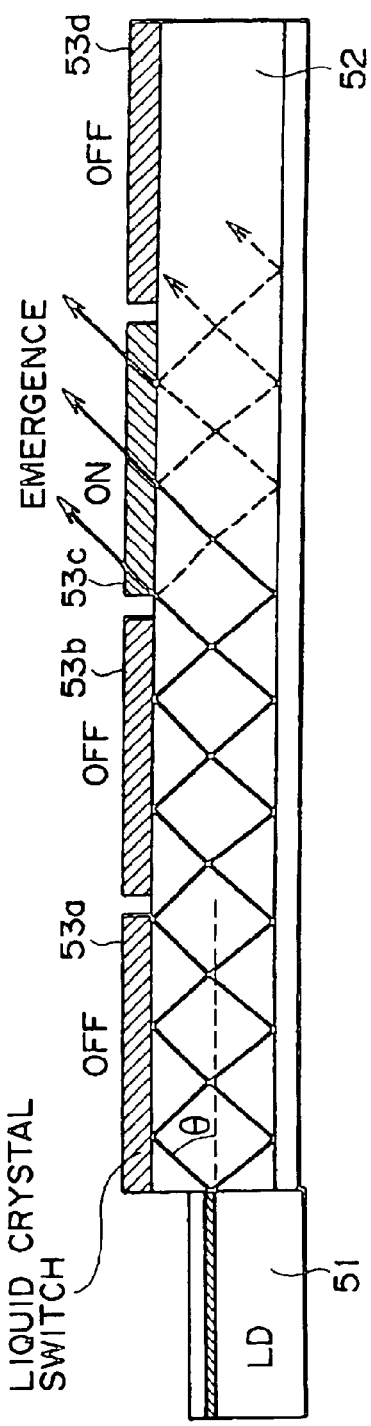

A second embodiment of the present invention will be described with reference to FIGS. 8A and 8B, 9, 10, 11 and 12. In this embodiment, it is intended to optimize a size of an optical switch as well as a size of an optical waveguide. FIGS. 8A and 8B shows a state in which light having been made incident on an optical waveguide emerges from one optical switch.

Referring to FIGS. 8A and 8B, an end face of a semiconductor laser 51, which functions as a semiconductor light emitting device, is in close-contact with an end face of an optical waveguide 52, and laser light (TE mode) emitted from the semiconductor laser 51 is made incident on the optical waveguide 52. A plurality of liquid crystal switches 53a, 53b, 53c and 53d, which function as optical switches, are arrayed on the optical waveguide 52. Each of the liquid crystal switches 53a to 53d is independently switched between an ON state and an OFF state in response to a voltage applied from a drive circuit (not shown) thereto. In the examples shown in FIGS. 8A and 8B, only the liquid crystal switch 53c is in the ON state and the other liquid crystal switches 53a, 53b and 53d are in the OFF states. Each of the liquid crystal switches 53a to 53d transmits light in the ON state and cuts off light in the OFF state.

FIG. 8A typically shows the case where a quantity of light allowed to emerge from the liquid crystal switch 53c in the ON state is small. Reversely, FIG. 8B typically shows the case where a quantity of light allowed to emerge from the liquid crystal switch 53c in the ON state is large. To produce a high-intensity display unit, liquid crystal switches used for the display unit may be configured so as to increase a quantity of light allowed to emerge from those, in the ON state, of the liquid crystal switches as shown in FIG. 8B.

Figure 9:
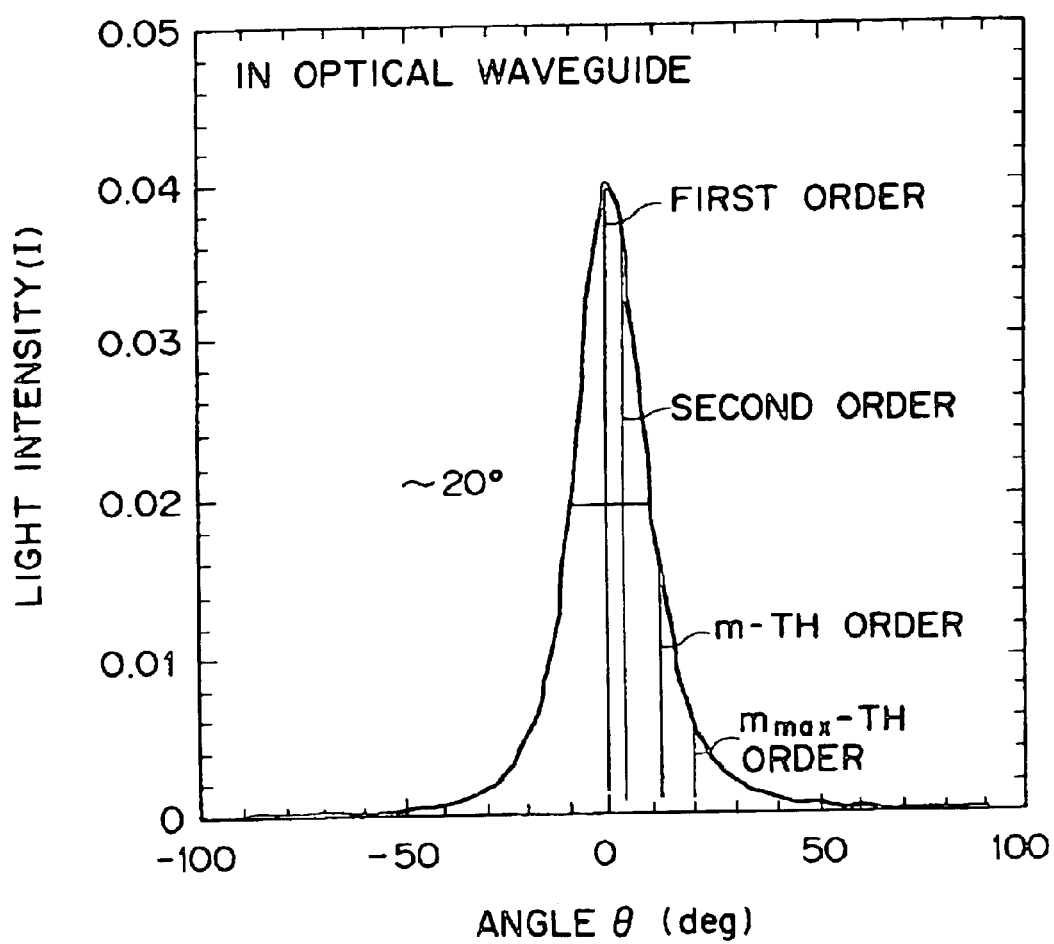
FIG. 9 is a graph showing a relationship between a light intensity and a supplementary angle in an optical waveguide according to the second embodiment of the present invention.

With respect to laser light emitted from the semiconductor laser 51, as shown in FIG. 9, a light intensity (I) in the optical waveguide on the ordinate is dependent on an incident supplementary angle θ and exhibits a Gauss distribution with a relatively narrow half-width. In the light intensity distribution shown in FIG. 9, a mode number is sequentially increased in the order of a first order mode, a second order mode, a third order mode . . . from a small angle θ portion depending on the angle θ. That is to say, the mode number becomes larger as the angle θ becomes larger. FIG. 10 shows data in an optical waveguide system, wherein the ordinate designate an incident supplementary angle θ and the abscissa designates a mode number. As is shown in the figure, as a thickness of an optical waveguide becomes thick, the mode number becomes large along with an increase in angle θ.

Figure 11:
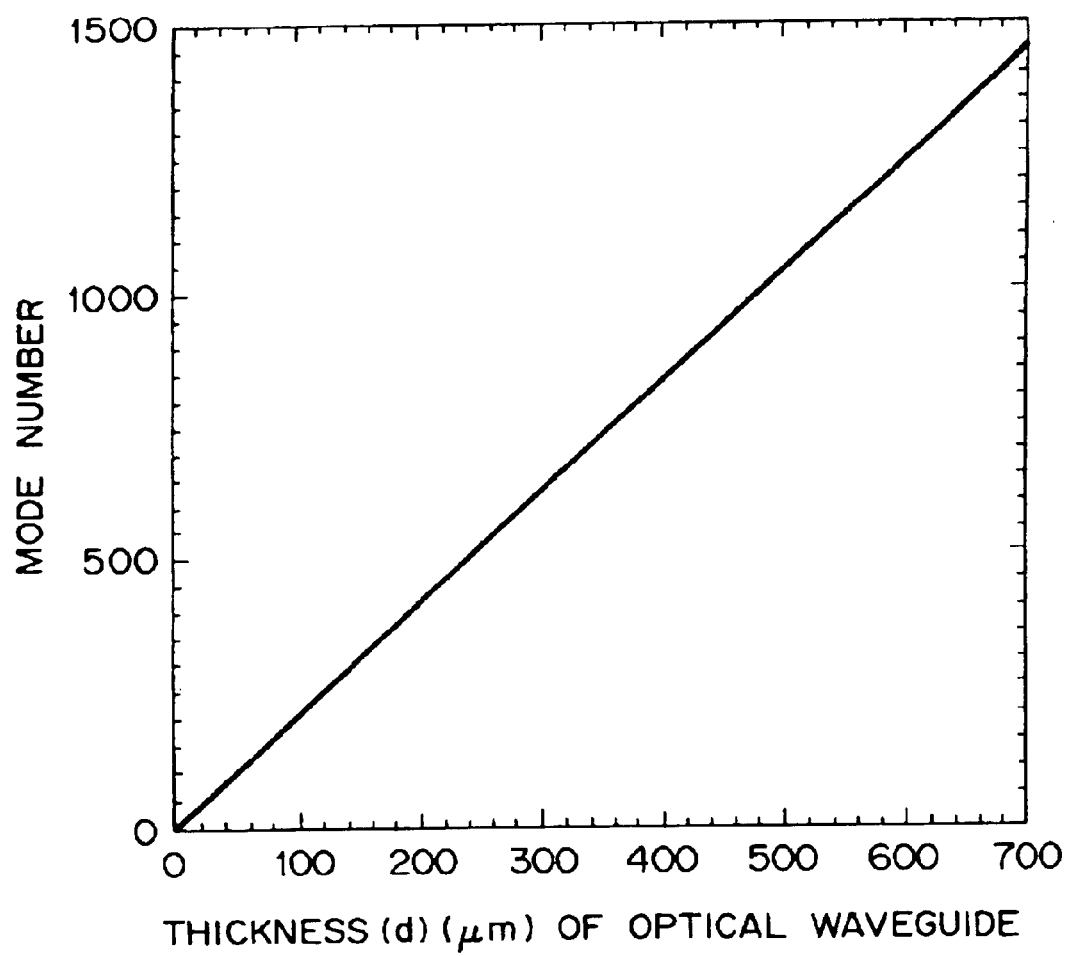
FIG. 11 is a graph showing a relationship between a mode number and a thickness of an optical waveguide in the case where laser light is made incident on the optical waveguide according to the second embodiment of the present invention.
Figure 13:
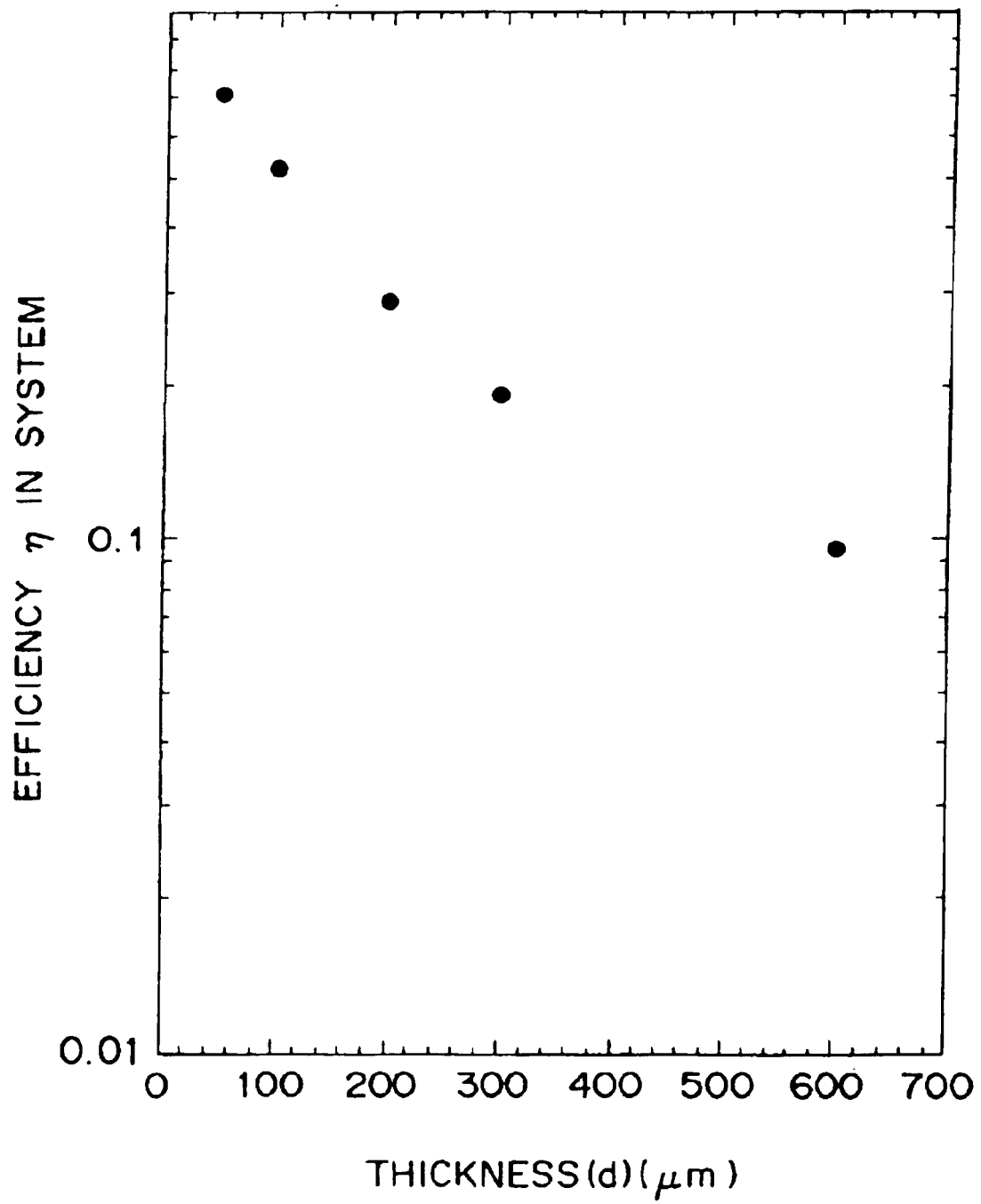
FIG. 13 is a graph showing a relationship between a system efficiency and a thickness of an optical waveguide in the case where laser light is made incident on the optical waveguide according to the second embodiment of the present invention.

FIG. 11 shows a relationship between a thickness "d" of an optical waveguide and a mode number. The mode number of laser light traveling in the optical waveguide is increased linearly with the thickness "d" of the optical waveguide. For example, when the thickness "d" of the optical waveguide exceeds 50 μm, the mode number exceeds 100, and in this case, a sufficient light intensity can be obtained. However, when the thickness "d" of the optical waveguide exceeds 200 μm, although the mode number is further increased, the light intensity is little increased. That is to say, in this case, the increase in mode number does not contribute to an increase in light intensity. FIG. 12 shows a calculation result of a light intensity of laser light of the TE mode, which has been made incident on an optical waveguide and is made to emerge from the optical waveguide via one optical switch having a length of 1 mm in the longitudinal direction of the optical waveguide, depending on a variable thickness "d" of the optical waveguide. The variable thickness "d" is selected from 10, 50, 100, 200, 300, and 600 μm. As shown in FIG. 12, when the thickness "d" of the optical waveguide exceeds 200 μm, the light intensity is little increased. This means that when the thickness "d" of the optical waveguide exceeds 200 μm, even if the mode number is increased, the probability that light is made incident on the optical switch with its one mode taken in an ON state is reduced. FIG. 13 shows the calculation result shown in FIG. 12 as an efficiency in a system. In this figure, the ordinate designates an efficiency in the system, and the abscissa designates a thickness "d" of an optical waveguide. A curve showing a dependence of the thickness of the optical waveguide on the efficiency is inclined rightward, downward. This means that the efficiency becomes low as the thickness "d" of the optical waveguide becomes large, and more specifically, the probability that light of each mode is made incident on one optical switch is reduced as the thickness "d" of the optical waveguide becomes large.

Based on the above-described relationship, an optimum thickness of an optical waveguide for increasing the light intensity can be determined. Assuming that a length of a function layer functioning as a switching portion in the longitudinal direction of an optical waveguide of an optical switch is set to 1 mm, the optimum thickness of the optical waveguide becomes a value in a range of 50 to 200 μm. Namely, if the thickness of the optical waveguide is excessively small, since the mode number is decreased, it is difficult to obtain a sufficient light intensity. Reversely, if the thickness of the optical waveguide is excessively large, since the probability that laser light is made incident on one liquid crystal switch as an optical switch is reduced, the light intensity is also lowered.

A thickness of an optical waveguide can be generalized with respect to a size of an optical switch For example, letting L μm be a length of a function layer of an optical switch in the longitudinal direction of the optical waveguide, the thickness of the optical waveguide suitable for realizing a high light emergence efficiency can be set in a range of 0.05·L μm to 0.2·L μm. If the length L μm of the function layer is set to 1,000±300 μm, the excellent light emergence efficiency, which corresponds to the above-described calculation result, can be obtained.

The function layer of the optical switch in this embodiment is one kind or a combination of two or more kinds selected from a group consisting of layers capable of, depending on a change in electric field or light, modulating a refractive index, a refractive index distribution, an emission intensity, a color density, a dielectric constant, and a permeability, and layers capable of, depending on a change in electric field or light, changing a liquid crystal alignment state, and scattering light. Such a device having a function layer allows selective emergence or cutoff of light. In particular, in the case of using the liquid crystal device 3 as the device having a function layer of the optical switch as in this embodiment, the liquid crystal device 3 may be desirable to have ferroelectric liquid crystal. The length of the function layer is an effective size for emergence and cutoff of light from the optical waveguide, and if a frame or the like is formed at an end portion of the function layer, a size of a portion of the function layer inside the frame becomes the length L used for determining the optimum thickness of the optical waveguide.

One of application examples of the present invention is a display unit using the above-described optical waveguides. If refractive indexes of respective optical switch are non-uniform, a light emergence efficiency is varied, with a result that there occurs an uneven luminance. According to the present invention, however, even if there may occur such a non-uniformity between the refractive indexes of adjacent two of the optical switches, since the light emergence efficiency is kept constant, it is possible to eliminate the occurrence of an uneven luminance.

As another application example, an optical switch of the present invention can be used for an optical communication field. In a complicated optical switch accompanied by parallel processing, even when a single signal is inputted, a multiple signals may be often outputted. For example, in the case where a plurality of optical switches are provided on one optical waveguide, if an efficiency of one optical switch is different from that of another optical switch, a signal intensity may be varied, tending to cause an error. According to the present invention, such a problem can be solved. The present invention is applicable not only to display units and optical communication units but also to centralized light emitting computing devices, two-dimensional computers, or other units on which a plurality of optical switches are arrayed.

As described above, according to the optical switch and the display unit using the optical switches in accordance with the present invention, since a small change region, in which a light emergence efficiency is not largely changed even if a thickness and a refractive index of a film are varied, is utilized, it is possible to easily realize uniformity of the light emergence efficiency, and since a thickness of an optical waveguide is optimized with respect to a size of an optical switch, it is possible to improve the light emergence efficiency and hence to realize a high-intensity output.

While the preferred embodiments of the present invention have been described using the specific terms, such description is for illustrative purposes only, and it is to be understood that changes and variations may be made without departing from the spirit or scope of the following claims.

What is claimed is:

1. An optical switch for making part of incident light, which contains a specific polarized light component and has been made incident on an optical waveguide, selectively emergent from said optical waveguide to a light emergence portion provided outside said optical waveguide, said optical switch comprising:

a multi-layer structure composed of a plurality of light transmissive layers disposed between said light emergence portion and said optical waveguide;

wherein letting σ be a refractive index control accuracy at the time of producing said multi-layer structure, a refractive index of at least one light transmissive layer in said multi-layer structure is different from a refractive index of a light transmissive layer other than said at least one light transmissive layer in said multi-layer structure by 3σ or more.

2. An optical switch according to claim 1, wherein said at least one light transmissive layer having the different refractive index is either of two inner layers, excluding the uppermost layer and the lowermost layer, of said multi-layer structure.

3. An optical switch for making part of incident light, which contains a specific polarized light component and has been made incident on an optical waveguide, selectively emergent from said optical waveguide to a light emergence portion provided outside said optical waveguide, said optical switch comprising:

a light transmissive stacked structure including a function layer for selective emergence of said incident light;

wherein letting $\Delta n$ be a difference between a refractive index $n_0$ of said optical waveguide and a refractive index $n_1$ of an arbitrary layer forming part of said stacked structure, "d" be a thickness of said arbitrary layer, and $\lambda$ be a wavelength of said incident light, the values of $\Delta n$, "d", and $\lambda$ satisfy a condition of $2.20 \times 10^{-3} \leq |\Delta n \cdot d \cdot \lambda^{-1}| \leq 3.03 \times 10^{-3}$.

4. An optical switch according to claim 3, wherein said optical waveguide has a refractive index ranging from 1.57 to 1.60; and said light transmissive stacked structure contains at least one layer disposed on said optical waveguide, said at least one layer having a refractive index ranging from 1.594 to 1.595 and a thickness ranging from 0.13 μm to 0.16 μm.

5. An optical switch according to claim 3, wherein said optical waveguide has a refractive index ranging from 1.57 to 1.60; and said light transmissive stacked structure contains two layers disposed on said optical waveguide, said two layers each having a refractive index ranging from 1.594 to 1.595 and a thickness ranging from 0.13 μm to 0.16 μm.

6. An optical switch according to claim 3, wherein said light transmissive stacked structure contains a transparent resin layer.

7. An optical switch according to claim 6, wherein said transparent resin layer is made from a polyimide based resin.

8. An optical switch according to claim 3, wherein said light transmissive stacked structure contains a transparent electrode layer.

9. An optical switch according to claim 3, wherein said optical waveguide is made from a polycarbonate based resin.

10. An optical switch according to claim 3, wherein said function layer is composed of one kind or two or more kinds of layers selected from a group consisting of layers capable of, depending on a change in electric field or light, modulating a refractive index, a refractive index distribution, an emission intensity, a color density, a dielectric constant, and a permeability, and layers capable of, depending on a change in electric field or light, changing a liquid crystal alignment state, and scattering light.

11. An optical switch according to claim 3, wherein said function layer is a ferroelectric liquid crystal, and is held between a pair of transparent resin layers.

12. An optical switch according to claim 3, wherein said incident light is light emitted from a semiconductor laser or a light emitting diode.

13. An optical switch for making part of incident light, which contains a specific polarized light component and has been made incident on an optical waveguide, selectively emergent from said optical waveguide to a light emergence portion provided outside said optical waveguide, said optical switch comprising:

a light transmissive stacked structure including a function layer for selective emergence of said incident light;

wherein letting $\Delta n$ be a difference between a refractive index $n_0$ of said optical waveguide and a refractive index $n_1$ of an arbitrary layer forming part of said stacked structure, "d" be a thickness of said arbitrary layer, and $\lambda$ be a wavelength of said incident light, the values of $\Delta n$, "d", and $\lambda$ satisfy a condition of $|\Delta n \cdot d \cdot \lambda^{-1}| \leq 3.03 \times 10^{-3}$ and $|\Delta n \cdot d \cdot \lambda^{-1}| \neq 0$.

* * * * *